US010699888B2

(12) United States Patent
Giannakopulos et al.

(10) Patent No.: US 10,699,888 B2
(45) Date of Patent: Jun. 30, 2020

(54) HYBRID MASS SPECTROMETER

(71) Applicant: Thermo Fisher Scientific (Bremen) GmbH, Bremen (DE)

(72) Inventors: Anastassios Giannakopulos, Bremen (DE); Alexander Makarov, Bremen (DE); Christian Albrecht Hock, Bremen (DE); Nicolaie Eugen Damoc, Stuhr (DE); Hamish Stewart, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 49 days.

(21) Appl. No.: 15/992,640

(22) Filed: May 30, 2018

(65) Prior Publication Data
US 2018/0350576 A1 Dec. 6, 2018

(30) Foreign Application Priority Data

Jun. 2, 2017 (EP) .................................... 17174365

(51) Int. Cl.
*H01J 49/40* (2006.01)
*H01J 49/00* (2006.01)
(Continued)

(52) U.S. Cl.
CPC ...... *H01J 49/0031* (2013.01); *H01J 49/0045* (2013.01); *H01J 49/10* (2013.01); *H01J 49/40* (2013.01); *H01J 49/425* (2013.01)

(58) Field of Classification Search
CPC .... H01J 49/0031; H01J 49/0045; H01J 49/10; H01J 49/40; H01J 49/425
See application file for complete search history.

(56) References Cited

U.S. PATENT DOCUMENTS 6,504,148 B1 * 1/2003 Hager ................... H01J 49/004
250/281
6,717,130 B2 4/2004 Bateman et al.
(Continued)

FOREIGN PATENT DOCUMENTS

CN 105051526 A 11/2015
CN 105051530 A 11/2015
(Continued)

OTHER PUBLICATIONS

Anonymous, "Unmatched analytical performance Revolutionary MS architecture Thermo Scientific Orbitrap Fusion Tribrid Mass Spectrometer," 12 pgs, Jan. 1, 2016.
(Continued)

*Primary Examiner* — Nicole M Ippolito
*Assistant Examiner* — Sean M Luck
(74) *Attorney, Agent, or Firm* — Charles B. Katz

(57) ABSTRACT

A data independent acquisition method of mass spectrometry for analyzing a sample within a mass range of interest as it elutes from a chromatography system. The method comprises selecting precursor ions within a mass range of interest to be analyzed, performing at least one MS1 scan of the precursor ions using a Fourier Transform mass analyser and performing a set of MS2 scans by segmenting the precursor ions into a plurality of precursor mass segments, each precursor mass segment having a mass range of no greater than 5 amu, and for each precursor mass segment fragmenting the precursor ions within that precursor mass segment and performing an MS2 scan of the fragmented ions.

22 Claims, 6 Drawing Sheets

(51) Int. Cl.
*H01J 49/10* (2006.01)
*H01J 49/42* (2006.01)

(56) References Cited

U.S. PATENT DOCUMENTS

| | | | |
|---|---|---|---|
| 6,982,414 B2 | 1/2006 | Bateman et al. | |
| 7,800,055 B2 | 9/2010 | Geromanos et al. | |
| 7,999,223 B2 | 8/2011 | Makarov et al. | |
| 8,809,770 B2 | 8/2014 | Bonner et al. | |
| 8,809,772 B2 | 8/2014 | Bonner et al. | |
| 8,841,605 B2* | 9/2014 | Makarov | H01J 49/0031 250/281 |
| 9,281,171 B2* | 3/2016 | Bateman | H01J 49/004 |
| 9,343,276 B2 | 5/2016 | Tate et al. | |
| 9,837,255 B2* | 12/2017 | Stephenson, Jr. | H01J 49/0445 |
| 2001/0007349 A1* | 7/2001 | Nagai | H01J 49/0027 250/281 |
| 2003/0001088 A1 | 1/2003 | Bateman et al. | |
| 2007/0023629 A1* | 2/2007 | Makarov | H01J 49/004 250/282 |
| 2010/0311176 A1* | 12/2010 | Williamson | G01N 33/6848 436/86 |
| 2012/0256083 A1 | 10/2012 | Kovtoun | |
| 2012/0261568 A1* | 10/2012 | Coon | H01J 49/0027 250/282 |
| 2013/0206979 A1* | 8/2013 | Bonner | H01J 49/42 250/282 |
| 2013/0334414 A1* | 12/2013 | McAlister | H01J 49/0031 250/283 |
| 2014/0346345 A1* | 11/2014 | Makarov | H01J 49/0045 250/283 |
| 2015/0021472 A1* | 1/2015 | Makarov | H01J 49/0045 250/283 |
| 2015/0028197 A1 | 1/2015 | Grinfeld et al. | |
| 2015/0090874 A1* | 4/2015 | Larson | H01J 49/0045 250/282 |
| 2015/0130810 A1* | 5/2015 | Yasuda | G06T 11/206 345/440 |
| 2015/0287585 A1 | 10/2015 | Kovtoun et al. | |
| 2018/0224406 A1 | 8/2018 | Xuan | |

FOREIGN PATENT DOCUMENTS

| | | |
|---|---|---|
| WO | WO2010136533 A1 | 12/2010 |
| WO | WO2012175517 A2 | 4/2013 |
| WO | 2013076307 A2 | 5/2013 |
| WO | WO2013110587 A2 | 8/2013 |
| WO | 2013171313 A1 | 11/2013 |

OTHER PUBLICATIONS

Chapman et al., "Multiplexed and data-independent tandem mass spectrometry for global proteome profiling," Mass Spectrometry Reviews, 33(6), 452-470, 2013.

Watson et al., "Introduction to mass spectrometry: instrumentation, applications, and strategies for data interpretation," John Wiley & Sons (ISBN: 978-0-470-51634-8, pp. 53-173, 2007.

Zhang et al., "Evaluation of Data-independent Acquisition (DIA) Approaches for Spiked Peptides in HeLa Digest on Q-OT-qIT Mass Spectrometer," Thermo Scientific, 7 pgs, 2016.

Zhang et al., "Quantitative Analysis of Targeted Proteins in Complex Sample Using Novel Data Independent Acquisition," Chinese Journal of Analytical Chemistry Volume Online English Edition of the Chinese Language Journal Chin J Anal Chem, 42(42), 1750-1758, 2014.

Xuan et al., "MS1-Based Quantification Optimization on DIA Methods on a Quadrupole-Orbitrap Mass Spectrometer", Poster Note 64738, 2016, https://tools.thermofisher.com/content/sfs/posters/PN-64738-MS1-Based-Quantification-ASMS2016-PN64738-EN.pdf.

* cited by examiner

HYBRID MASS SPECTROMETER

CROSS-REFERENCE TO RELATED APPLICATION

This application claims the priority benefit under 35 U.S.C. § 119 to European Patent Application No. 17174365.1, filed on Jun. 2, 2017, the disclosure of which is incorporated herein by reference.

FIELD OF THE INVENTION

The present invention relates to data independent analysis (DIA) of organic and in particular biological samples such as proteins, peptides, metabolites, lipids and the like. In particular, it relates to a high resolution data independent identification and quantification technique with applications in proteomics, metabolomics, lipidomics and so forth.

BACKGROUND OF THE INVENTION

Mass spectrometry is a long established technique for identification and quantitation of often complex mixtures of large organic molecules. In recent years, techniques have been developed that allow analysis of a wide range of both biological and non-biological materials, with application across the fields of law enforcement (e.g. identification of drugs and explosives materials), environmental, scientific research, and biology (e.g. in proteomics, the study of simple and complex mixtures of proteins, with applications in drug discovery, disease identification and so forth).

Proteins, comprising large numbers of amino acids, are typically of significant molecular weight. Thus accurate identification and quantitation of the protein by direct mass spectrometric measurement is challenging. It is thus well known to carry out fragmentation of the precursor sample material. A variety of fragmentation techniques are known, which may result in the generation of different fragment ions from the precursor ions. Moreover, the fragmentation mechanism may be affected by different applied fragmentation energies.

Analysis of samples can broadly be separated into data independent analysis/acquisition (DIA) and data dependent analysis/acquisition (DDA) techniques. DIA seeks to determine what is present in a sample of potentially unknown identity. To determine the molecular structure of sample molecules, a mass spectrometer is first used to mass analyse all sample ions (precursor ions) within a selected window of mass to charge ratio (m/z). Such a scan is often denoted as an MS1 scan. The selected sample ions are then fragmented and the resulting fragments are subsequently mass analyzed across the selected m/z range. The scan of the fragmented ions is often denoted as an MS2 scan.

DDA by contrast, seeks to confirm that one or more species is/are present in a given sample. Methods of DDA identify a fixed number of precursor ion species, and select and analyze those via mass spectrometry. The determination of which precursor ion species are of interest in DDA may be based upon intensity ranking (for example, the top ten most abundant species as observed by peaks in a MS1 spectrum"), or by defining an "inclusion list" of precursor mass spectral peaks (for example by user selection), from which MS2 spectra are always acquired regardless of the intensity ranking of the peak in the MS1 mass spectrum. Still otherwise, an "exclusion list" of peaks in MS1 can be defined, for example by a user, based e.g. on prior knowledge of the expected sample contents.

DIA avoids the decisions necessary in DDA, by simply dividing the mass range of interest (typically user defined) into segments and obtaining MS2 spectra for each segment. With DIA, the acquisition of an MS1 precursor spectrum becomes more or less optional, since the parameters of the selection window for the sample ions carries information about the range of possible sample ions within that window.

Early DIA techniques were disclosed in patent applications by Micromass UK Ltd and Waters Technologies Corporation, in their so-called $MS^E$ arrangements. The DIA techniques resulted from application of known triple quadrupole methods to quadrupole-TOF arrangements.

In U.S. Pat. No. 6,717,130, a technique is disclosed in which MS1 and MS2 are alternatively acquired by repeatedly switching the energy of the fragmentation cell. The technique relies upon separation of the sample molecules through different elution times in a chromatography environment. At the end of an experimental run, precursor and fragment ions are recognized by comparing the mass spectra in the two different fragmentation modes. Fragment ions are matched to particular precursor ions on the basis of the closeness of fit of their elution times, so that precursor ions can then be identified.

U.S. Pat. No. 6,982,414 discloses a development to the DIA technique in the '130 patent described above. Here, the energy applied to the fragmentation cell is again repeatedly switched so as to obtain both MS1 and MS2. However here MS1 and MS2 are obtained from both a first and a second sample separately.

The mass spectra are then compared and further analysis is carried out where precursor ions in MS1 from each sample, or fragment ions in MS2 from each sample, are expressed differently.

Finally U.S. Pat. No. 7,800,055 again employs switching between energy levels in the fragmentation chamber so as to generate MS1 and MS2 in alternating manner. Comparison of the chromatographic peak shape of the precursor and fragment peaks is carried out to identify an association between precursor and fragment (product) ions.

An alternative approach to DIA, known as "SWATH", has been proposed in various patents to DH Technologies Development Pte. Ltd.

In U.S. Pat. No. 8,809,770, a DIA data set is acquired such that the data may subsequently be analyzed for a target substance. This contrasts with the idea of setting a target and then acquiring data only for that purpose. The method employs LC-MS and uses wide windows of precursor ions (e.g. >10, >15, >20 amu) for MS2, allowing the whole precursor space to be covered.

Again the '770 patent stresses the importance of retaining the fidelity of the chromatographic peaks in the MS2 spectrum, by appropriate setting of the windows. An MS1 spectrum is indicated to be optional.

As an example, the '770 patent describes a method—akin to single reaction monitoring (SRM)—for evaluation of the MS2 data of a precursor mass window as a function of retention time, and for subsequent comparison with a reference spectrum library.

U.S. Pat. No. 8,809,772 employs isolation windows for the precursor ions, of variable width, the width being dependent upon the precursor mass. The method trades off analysis speed (for a wide window) and sensitivity/specificity (for a narrow window).

U.S. Pat. No. 9,343,276 addresses drawbacks with the methods disclosed in U.S. Pat. No. 8,809,770 by scoring extracted ion chromatogram (XIC) peak candidates based on various criteria, in a comparison between the XIC fragment peaks with the MS1 information, such as mass accuracy, charge state, isotopic state, known neutral losses and so forth.

A common aspect of the approach in the $MS^E$ and SWATH techniques described above is that they seek to optimize measurements for good MS2 time resolution. To obtain sufficient data points across the LC peak for good quantitation, either a relatively wide precursor isolation window (24 Da)—as suggested in the $MS^E$ patents discussed above—or a variable width precursor isolation window (the preferred approach for the SWATH patents discussed above) needs to be employed.

The consequence is that the traditional database search— in which sample fragment spectra are compared against fragment spectra of known species in a library, as is the case with DDA—may not be well suited for DIA data analysis. In the case of the SWATH technique, a large spectral library must first be created (for the same or similar sample types) for targeted extraction of MS2 chromatograms from convoluted spectra, which is an expensive and time consuming task.

In "Evaluation of Data-independent Acquisition (DIA) Approaches for Spiked Peptides in HeLa Digest on Q-OT-qIT Mass Spectrometer", Wei Zhang et al. (available at http://tools.thermofisher.com/content/sfs/posters/PN-64122-Q-OT-qIT-ASMS2014-PN64122-EN.pdf) a method of DIA analysis using a tandem mass spectrometer is disclosed. In particular, an Orbitrap mass spectrometer is used to perform MS1 scans of precursor ions, while a linear ion trap is used to perform MS2 analysis of the fragmented ions using a mass window of 3 amu for each MS2 scan. By using a narrow mass window, the resulting data can be directly used for database searching, realizing the integration of DDA and DIA methodologies.

SUMMARY OF THE INVENTION

For DIA methodologies performed on narrow chromatographic peaks of the order of several seconds, one ideally needs to sample the chromatographic peak at least seven or better still at least ten times over the full m/z range. This requirement constantly forces shorter and shorter DIA cycle times, currently 2-3 seconds is considered the upper limit of allowed cycle time for applications in proteomics and metabolomics. At the same time, the requirement for deeper coverage of different proteomes/metabolomes leads to bigger and bigger spectral libraries being required for quantitation of the DIA data.

The present inventors have realized that one problem with existing DIA methodologies is that large spectral libraries of fragment spectra are required for quantitation of fragment spectra in the MS2 domain. The present inventors have realized that it would be desirable to move to a library free approach for DIA analysis of samples. In order to achieve such library free analysis, the present inventors propose a method and apparatus that enables significantly higher specificity and speed of DIA.

For example, a method of DIA analysis using a mass window of 3 amu for each MS2 scan is discussed above. This relatively narrow mass window is similar to the targeted mass windows used in a known DDA approach. By using relatively narrow mass windows for each of the MS2 scans, the resulting MS2 spectra may be analyzed using DDA type databases, rather than requiring full DIA-specific spectral libraries.

The present inventors have identified that one problem with using such a narrow mass window for each of the MS2 scans, is that the number of scans required to build up a full range of MS2 scans for the mass range of interest increases. As a result, the time taken to perform a complete DIA analysis can become overly long, for example much longer than the duration of a chromatographic peak. If the DIA analysis is not completed within the duration of the chromatographic peak, the analysis may not provide meaningful data, as some parts of the analysis will not measure the sample peak.

Furthermore, another problem identified by the inventors with this approach, is that the relatively narrow mass windows for each MS2 scan result in relatively few, if any, fragmenting ions reaching the detector at a given time. Thus, reducing the mass selection window for each MS2 scan results in a reduction in the mass accuracy and/or the sensitivity of the MS2 mass analyzer. This problem is exacerbated when attempting to perform a large number of MS2 scans at a sufficient frequency to fit all MS2 scans within the duration of a chromatographic peak.

The present invention seeks to address the shortcomings of existing DIA approaches. In accordance with a first aspect of the present invention, there is provided a method of data independent analysis (DIA) in accordance with claim 1. The invention also extends to a mass spectrometer in accordance with claim 14.

In order to acquire data suitable for identification/quantitation of precursor ions using a DDA type database, the present invention acquires MS1 and MS2 spectra utilizing high resolution, high mass accuracy mass analyzers. In particular, in the MS2 domain, the present invention acquires MS2 spectra of narrow mass segments of less than 5 amu. In this way, the MS2 spectra can be analyzed with DDA-type databases. In particular, it is important that the MS2 spectra are acquired using high mass accuracy, high resolution mass analyzers in order to identify fragments with sufficient accuracy for the DDA-type databases to be applicable.

Advantageously, by utilizing a Time of Flight (TOF) mass analyzer in tandem with a FTMS mass analyzer, high mass accuracy scans may be performed in both the MS1 and MS2 domains. Furthermore, the MS2 scans utilize a TOF mass analyzer which is preferably operated at a frequency of at least 100 Hz in order to perform the plurality MS2 scans of the precursor mass segments of less than 5 amu. By performing the plurality of MS2 scans at such a frequency, MS2 spectra corresponding to narrow windows of precursor ions may be acquired across the full mass range of interest within a cycle time that allows the DIA methodology to fully sample a chromatographic peak.

Importantly, MS1 data may be acquired across the full mass range of interest in tandem with the acquiring of the MS2 data. By utilizing a FTMS mass analyzer, high resolution high mass accuracy MS1 data may also be acquired to complement the MS2 data. Furthermore, by acquiring the MS1 data in tandem with the MS2 data, the total cycle time may be reduced compared to performing MS1 scans serially with the MS2 scans.

Preferably, the fragmented ions are accumulated prior to injection into the time of flight mass analyzer. By accumulating fragmented ions for a predetermined time (duration) prior to mass analysis in the MS2 domain, the number of fragmented ions in each packet of ions is increased. Methods and apparatus for accumulation of ions are described below. This may lead, in preferred embodiments, to all fragmented ions being utilized for MS2 scans, thereby increasing the duty cycle. As a time of flight mass analyzer is used to mass analyze each packet of fragmented ions, by increasing the number of ions in each packet, the intensity of the signal detected at a detector of the time of flight mass analyzer is increased.

Preferably, the time of flight mass analyzer is operated at a frequency of at least 100 Hz or at least: 150 Hz, 200 Hz, 250 Hz or 300 Hz. By providing a minimum operating frequency for the TOF mass analyzer, the total cycle time of the DIA methodology may be reduced relative to the duration of the chromatographic peak, and thus ensuring that the sample ions are suitably sampled. Preferably, the TOF mass analyzer is operated at a frequency no greater than 1000 Hz, or more preferably 900 Hz, 800 Hz or 700 Hz in order to provide sufficient time for the accumulation fragmented ions prior to the injection into the TOF analyzer. Advantageously, by accumulating fragmented ions and mass analyzing the fragmented ions as a packet, the resolution and mass accuracy of the resulting MS2 scans may be increased, while still achieving a suitable frequency of operation which allows for the analysis of a relatively wide mass range (e.g. 400-1000 m/z) over the duration of a chromatographic peak.

Preferably, the present invention utilizes an orbital trapping mass analyzer to perform relatively high resolution MS1 scans of the precursor ions. Thus, data in the MS1 domain may also be captured with high resolution and high mass accuracy. Other mass analyzers of high resolution could be utilized as the first mass analyzer to perform the MS1 scans. For example, an ion cyclotron resonance (ICR) mass analyzer or a time of flight mass analyzer (especially a multi-reflection time of flight mass analyzer).

Preferably, the FTMS mass analyzer performs MS1 scans at a mass resolution of at least 50,000, or more preferably at least: 75,000, 100,000, 150,000 or 200,000 (resolution at 200 m/z). Where other types of mass analyzer are used for the MS1 scans of the precursor ions, they also preferably perform the MS1 scans at a mass resolution of at least 50,000, or more preferably at least: 75,000, 100,000, 150,000 or 200,000 (resolution at 200 m/z). By performing MS1 scans at such a mass resolution, the MS1 data may be more suitable for analysis using a DDA-type library thus resulting in increased accuracy of precursor quantitation/identification.

Preferably, the present invention utilizes a multiple reflection time of flight mass analyzer (mr-TOF) to perform the plurality of MS2 scans. By utilizing a mr-TOF, the flight time of the packets of fragmented ions may be increased due to the multiple reflections included in the flight path of the ions packets through the mr-TOF. Utilizing a relatively long flight path, for example in excess of 10 m, or 15 m, or preferably 20 m, or more preferably 25 m is advantageous, as it increases the time resolution of each packet arriving at the detector in the mr-TOF and may reduce adverse space-charge effects. Examples of mr-TOF mass analyzers include orbital-type mr-TOF analyzers as described in WO 2010/0136533 or tilted-mirror type mr-TOF analyzers as described in WO 2013/110587. Thus the resolution of MS2 scans using an mr-TOF may be increased without requiring an increase in measurement time for each scan. Accordingly, a plurality of narrow mass window (i.e. less than 5 amu) MS2 scans may be performed within the duration of a chromatographic peak in accordance with the methodology of the present invention.

Preferably, the mass range of each segment of precursor ions scanned in the MS2 domain is not greater than 3 amu, or more preferably not greater than: 2.5 amu or 2 amu. By reducing the mass range of each segment of precursor ions fragmented for MS2 analysis, the resulting MS2 spectrum has a reduced number of possible precursor ions from which it was formed. Accordingly, the complexity of the resulting MS2 spectra may be reduced, thereby improving the subsequent analysis of the MS2 spectra for quantitation and/or identification of precursor ions.

Preferably, the mass resolution of the TOF mass analyzer is at least 40,000 for each of the MS2 scans (resolution at 200 m/z). More preferably, the resolution of the TOF analyzer is at least 45,000 or 50,000. By providing MS2 scans at such a resolution, the mass accuracy of the MS2 spectra may be matched to the corresponding high resolution, high mass accuracy MS1 scans and/or may be matched to DDA-type databases for quantitation and/or identification of the sample.

Preferably, at least X % of the MS2 scans contain more than Y ion counts, wherein X=30, or 50, or 70, or 90, and Y=200, or 500, or 1000, or 3000, or 5000. By ensuring that at least a specified percentage of the MS2 scans have a minimum ion count, the dynamic range of the MS2 scans may be increased. Accordingly, the mass accuracy of the resulting MS2 data is increased.

Preferably, the DIA methodology is repeated a number of times over the duration of a chromatographic peak. Accordingly, the cycle time of the DIA measurement may be adapted to be performed a plurality of times over the duration of a chromatographic peak. By performing the DIA methodology a number of times over the duration of the chromatographic peak, the peak may be sampled a number of times, allowing a complete picture of the peak to be established. Preferably, the DIA methodology is performed at least: 3, 4, 5, 7, 9 or more preferably 10 times over the duration of a chromatographic peak.

Preferably, the performing of the MS1 scan of the precursor ions across the mass range of interest further comprises separating the precursor ions in the mass range of interest into a plurality of mass sub-ranges, and for each mass sub-range of precursor ions mass analyzing the sub-range of precursor ions using the Fourier Transform mass analyzer. As such, the MS1 scan of the precursor ions in the mass range of interest is split into a set (plurality) of MS1 scans of a plurality of mass sub-ranges of the precursor ions, wherein the combination of the plurality of mass sub-ranges make up the mass range of interest. By separating the MS1 scan into a set of MS1 scans, space charge effects associated with the relatively wide precursor mass range may be reduced. Preferably, the mass range of the precursor ions in each mass sub-range is no greater than 300 amu, or more preferably 200 amu, or more preferably 100 amu. By reducing the mass range of each mass sub-range, space charge effects may be further reduced.

Preferably, the mass range of interest has a mass range of at least 600 amu, more preferably at least 800 amu, or more preferably at least 1000 amu. For example, the mass range of interest may be 400 m/z to 1000 m/z. By varying the width of the mass range of interest, the time for performing the DIA analysis may be adapted in order to correspond to the duration of a chromatographic peak. The precursor mass range of interest may also be chosen based on a desired mass range of precursor ions to be analyzed.

In a preferred embodiment, the invention comprises: separating the precursor ions into a plurality of precursor mass sub-ranges across the mass range of interest;
  wherein for each precursor mass sub-range:
  performing an MS1 scan, each MS1 scan comprising:
  mass analyzing the precursor ions of the precursor mass sub-range across the mass range of the precursor mass sub-range using a first, preferably FTMS, mass analyzer; and ii) performing a plurality of MS2 scans, the plurality of MS2 scans comprising:

further separating the precursor mass sub-ranges into a plurality of precursor mass sub-range segments across the mass range of the precursor mass sub-range, each precursor mass sub-range segment having a mass range of no greater than 5 amu;

wherein for each precursor mass sub-range segment:

fragmenting the precursor ions within that precursor mass sub-range segment;

performing an MS2 scan of the fragmented ions by:

forming an ion packet from the fragmented ions (preferably by accumulating the fragmented ions, preferably in an ion trap, to form a packet of fragmented ions); and injecting the ion packet of fragmented ions into a time of flight mass analyzer and mass analyzing the fragmented ions of the fragmented mass sub-range segment.

Preferably, performing an MS2 scan of the set of MS2 scans includes combining fragmented ions from a plurality of precursor mass segments such that the combined fragmented ions are mass analyzed. Preferably, a plurality of precursor mass segments are fragmented together and subsequently mass analyzed together. Preferably, the data resulting in this way from the set of MS2 scans is deconvoluted to obtain MS2 spectra for each of the precursor mass segments. In another preferred embodiment, a plurality of precursor mass segments are fragmented separately, e.g. separately in time (sequentially), and subsequently mass analyzed together (optionally in wherein the set of MS2 scans is deconvoluted to obtain MS2 spectra for each of the precursor mass segments). By performing MS2 scans of a plurality of precursor mass segments at the same time, the time taken to obtain the MS2 spectra may be reduced. Additionally, the method allows one or more of the precursor mass segments to be mass analyzed as part of more than one combination. Thus, the mass accuracy of the resulting MS2 mass spectra may be improved as a result of multiple MS2 scans of precursor mass segments.

In accordance with a second aspect of the invention, a mass spectrometer is provided according to claim 14.

In accordance with a third aspect of the invention, a computer program comprising instructions to cause the mass spectrometer the second aspect of the invention to execute the steps of the method according to the first aspect of the invention. For example, the third aspect includes a computer program comprising instructions to cause the mass spectrometer of any one of claims 14 to 24 to execute the steps of the method according to any one of claims 1 to 13.

In accordance with a fourth aspect of the invention, a computer-readable medium having stored thereon the computer program of the third aspect is provided, A fifth aspect of the invention provides a data independent acquisition method of mass spectrometry for analyzing a sample within a mass range of interest, the method being performed within a time period based on a width of a chromatographic peak of the sample as it elutes from a chromatography system. The method comprises a step of ionizing the sample to produce a plurality of precursor ions. The method also comprises a step of performing an MS1 scan of the precursor ions including mass analyzing the precursor ions across the mass range of interest using a first mass analyzer at a resolution of at least 50,000 at m/z=200 for identification and/or quantitation of the precursor ions in the MS1 domain. The method also comprises a step of performing a set of MS2 scans. Performing the set of MS2 scans comprises segmenting the precursor ions into a plurality of precursor mass segments, where each precursor mass segment has a mass range of no greater than 5 amu. For each precursor mass segment, the method comprises fragmenting the precursor ions within that precursor mass segment and performing an MS2 scan of the fragmented ions. Performing the MS2 scan of the fragmented ions comprises forming an ion packet from the fragmented ions and injecting the ion packet of fragmented ions into a time of flight mass analyzer and mass analyzing the fragmented ions. The time of flight mass analyzer performs each of the MS2 scans at a resolution of at least 40,000 at m/z=200. Preferably the time of flight mass analyzer performs the MS2 scans at a frequency of at least 100 Hz. For example, the first mass analyzer according to the fifth aspect may be a Fourier Transform mass analyzer or a Time of Flight mass analyzer which is distinct from the Time of flight mass analyzer used to perform the MS2 scans.

The advantages and optional features of the first aspect of the invention as discussed above applies equally to the second, third, fourth, and fifth aspects of the invention.

BRIEF DESCRIPTION OF THE DRAWINGS

The invention may be put into practice in a number of ways and specific embodiments will now be described by way of example only and with reference to the Figures in which.

DETAILED DESCRIPTION OF PREFERRED EMBODIMENTS

Herein the term mass may be used to refer to the mass-to-charge ratio, m/z. The resolution of a mass analyzer is to be understood to refer to the resolution of the mass analyzer as determined at a mass to charge ratio of 200 unless otherwise stated.

Figure 1:
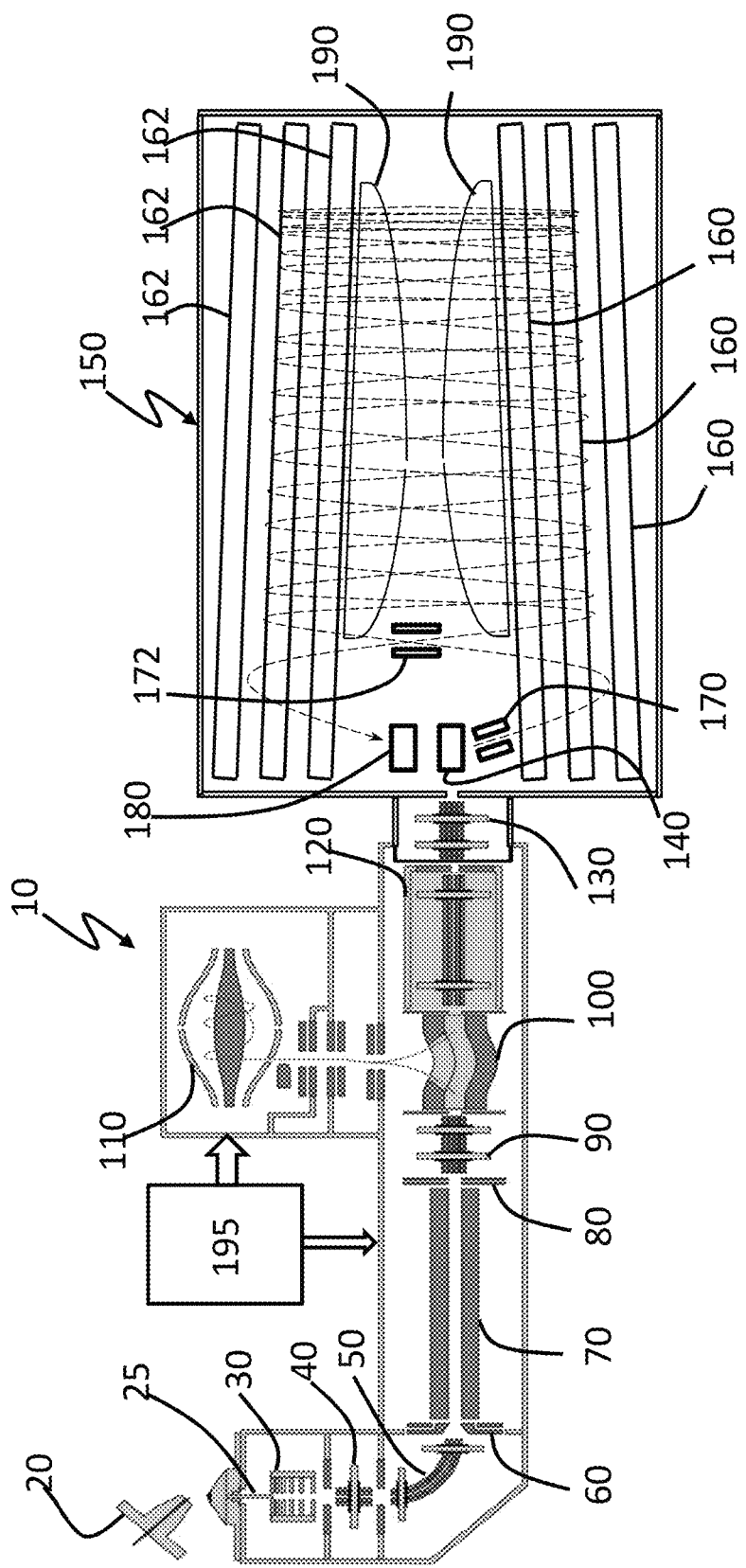
FIG. 1 shows a schematic diagram of a mass spectrometer suitable for carrying out methods in accordance with embodiments of the invention.

FIG. 1 shows a schematic arrangement of a mass spectrometer 10 suitable for carrying out methods in accordance with embodiments of the present invention.

In FIG. 1, a sample to be analyzed is supplied (for example from an autosampler) to a chromatographic apparatus such as a liquid chromatography (LC) column (not shown in FIG. 1). One such example of an LC column is the Thermo Fisher Scientific, Inc ProSwift monolithic column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase.

A chromatograph may be produced by measuring over time the quantity of sample molecules which elute from the HPLC column using a detector (for example a mass spectrometer). Sample molecules which elute from the HPLC column will be detected as a peak above a baseline measurement on the chromatograph. Where different sample molecules have different elution rates, a plurality of peaks on the chromatograph may be detected. Preferably, individual sample peaks are separated in time from other peaks in the chromatogram such that different sample molecules do not interfere with each other.

On a chromatograph, a presence of a chromatographic peak corresponds to a time period over which the sample molecules are present at the detector. As such, a width of a chromatographic peak is equivalent to a time period over which the sample molecules are present at a detector. Preferably, a chromatographic peak has a Gaussian shaped profile, or can be assumed to have a Gaussian shaped profile. Accordingly, a width of the chromatographic peak can be determined based on a number of standard deviations calculated from the peak. For example, a peak width may be calculated based on 4 standard deviations of a chromatographic peak. Alternatively, a peak width may be calculated based on the width at half the maximum height of the peak. Other methods for determining the peak width known in the art may also be suitable.

The sample molecules thus separated via liquid chromatography are then ionized using an electrospray ionization source (ESI source) 20 which is at atmospheric pressure.

Sample ions then enter a vacuum chamber of the mass spectrometer 10 and are directed by a capillary 25 into an RF-only S lens 30. The ions are focused by the S lens 30 into an injection flatapole 40 which injects the ions into a bent flatapole 50 with an axial field. The bent flatapole 50 guides (charged) ions along a curved path through it while unwanted neutral molecules such as entrained solvent molecules are not guided along the curved path and are lost.

An ion gate (TK lens) 60 is located at the distal end of the bent flatapole 50 and controls the passage of the ions from the bent flatapole 50 into a downstream mass selector in the form of a quadrupole mass filter 70. The quadrupole mass filter 70 is typically but not necessarily segmented and serves as a band pass filter, allowing passage of a selected mass number or limited mass range while excluding ions of other mass to charge ratios (m/z). The mass filter can also be operated in an RF-only mode in which it is not mass selective, i.e. it transmits substantially all m/z ions. For example, the quadrupole mass filter 70 may be controlled by the controller 130 to select a range of mass to charge ratios to pass of the precursor ions which are allowed to mass, while the other ions in the precursor ion stream are filtered. Alternatively, the S lens 30 may be operated as an ion gate and the ion gate (TK lens) 60 may be a static lens.

Although a quadrupole mass filter is shown in FIG. 1, the skilled person will appreciate that other types of mass selection devices may also be suitable for selecting precursor ions within the mass range of interest. For example, an ion separator as described in US-A-2015287585, an ion trap as described in WO-A-2013076307, an ion mobility separator as described in US-A-2012256083, an ion gate mass selection device as described in WO-A-2012175517, or a charged particle trap as described in US799223, the contents of which are hereby incorporated by reference in their entirety. The skilled person will appreciate that other methods selecting precursor ions according to ion mobility, differential mobility and/or transverse modulation may also be suitable.

The isolation of a plurality of ions of different masses or mass ranges may also be performed using the method known as synchronous precursor scanning (SPS) in an ion trap. Furthermore, in some embodiments, more than one ion selection or mass selection device may be provided. For example, a further mass selection device may be provided downstream of the fragmentation chamber 120. In this way, $MS^3$ or $MS^n$ scans can be performed if desired (typically using the TOF mass analyzer for mass analysis).

Ions then pass through a quadrupole exit lens/split lens arrangement 80 and into a first transfer multipole 90. The first transfer multipole 90 guides the mass filtered ions from the quadrupole mass filter 70 into a curved linear ion trap (C-trap) 100. The C-trap (first ion trap) 100 has longitudinally extending, curved electrodes which are supplied with RF voltages and end caps that to which DC voltages are supplied. The result is a potential well that extends along the curved longitudinal axis of the C-trap 100. In a first mode of operation, the DC end cap voltages are set on the C-trap so that ions arriving from the first transfer multipole 90 are captured in the potential well of the C-trap 100, where they are cooled. The injection time (IT) of the ions into the C-trap determines the number of ions (ion population) that is subsequently ejected from the C-trap into the mass analyzer.

Cooled ions reside in a cloud towards the bottom of the potential well and are then ejected orthogonally from the C-trap towards the first mass analyzer 110. As shown in FIG. 1, the first mass analyzer is an orbital trapping mass analyzer 110, for example the Orbitrap® mass analyzer sold by Thermo Fisher Scientific, Inc. The orbital trapping mass analyzer 110 has an off center injection aperture and the ions are injected into the orbital trapping mass analyzer 110 as coherent packets, through the off center injection aperture. Ions are then trapped within the orbital trapping mass analyzer by a hyperlogarithmic electric field, and undergo back and forth motion in a longitudinal direction while orbiting around the inner electrode.

The axial (z) component of the movement of the ion packets in the orbital trapping mass analyzer is (more or less) defined as simple harmonic motion, with the angular frequency in the z direction being related to the square root of the mass to charge ratio of a given ion species. Thus, over time, ions separate in accordance with their mass to charge ratio.

Ions in the orbital trapping mass analyzer are detected by use of an image detector (not shown) which produces a "transient" in the time domain containing information on all of the ion species as they pass the image detector. The transient is then subjected to a Fast Fourier Transform (FFT) resulting in a series of peaks in the frequency domain. From these peaks, a mass spectrum, representing abundance/ion intensity versus m/z, can be produced.

In the configuration described above, the sample ions (more specifically, a mass range segment of the sample ions within a mass range of interest, selected by the quadrupole mass filter) are analyzed by the orbital trapping mass analyzer without fragmentation. The resulting mass spectrum is denoted MS1.

Although an orbital trapping mass analyzer 110 is shown in FIG. 1, other Fourier Transform mass analyzers may be employed instead. For example a Fourier Transform Ion Cyclotron Resonance (FTICR) mass analyzer may be utilized as mass analyzer for the MS1 scans. Mass analyzers, such as the orbital trapping mass analyzer and Ion Cyclotron Resonance mass analyzer, may also be used in the invention even where other types of signal processing than Fourier transformation are used to obtain mass spectral information from the transient signal (see for example WO 2013/171313, Thermo Fisher Scientific).

In a second mode of operation of the C-trap 100, ions passing through the quadrupole exit lens/split lens arrangement 80 and first transfer multipole 90 into the C-trap 100 may also continue their path through the C-trap and into the fragmentation chamber 120. As such, the C-trap effectively operates as an ion guide in the second mode of operation. Alternatively, cooled ions in the C-trap 100 may be ejected from the C-trap in an axial direction into the fragmentation chamber 120. The fragmentation chamber 120 is, in the mass spectrometer 10 of FIG. 1, a higher energy collisional dissociation (HCD) device to which a collision gas is supplied. Precursor ions arriving into the fragmentation chamber 120 collide with collision gas molecules resulting in fragmentation of the precursor ions into fragment ions.

Although an HCD fragmentation chamber 120 is shown in FIG. 1, other fragmentation devices may be employed instead, employing such methods as collision induced dissociation (CID), electron capture dissociation (ECD), electron transfer dissociation (ETD), photodissociation, and so forth.

Fragmented ions may be ejected from the fragmentation chamber 120 at the opposing axial end to the C-trap 100. The ejected fragmented ions pass into a second transfer multipole 130. The second transfer multipole 130 guides the fragmented ions from the fragmentation chamber 120 into an extraction trap (second ion trap) 140. The extraction trap 140 is a radio frequency voltage controlled trap containing a buffer gas. For example, a suitable buffer gas is argon at a pressure in the range $5 \times 10^{-4}$ mBar to $1 \times 10^{-2}$ mBar. The extraction trap has the ability to quickly switch off the applied RF voltage and apply a DC voltage to extract the trapped ions. A suitable flat plate extraction trap, also referred to as a rectilinear ion trap, is further described in U.S. Pat. No. 9,548,195 (B2). Alternatively, a C-trap may also be suitable for use as a second ion trap.

The extraction trap 140 is provided to form an ion packet of fragmented ions, prior to injection into the time of flight mass analyzer 150. The extraction trap 140 accumulates fragmented ions prior to injection of the fragmented ions into the time of flight mass analyzer 150.

Although an extraction trap (ion trap) is shown in the embodiment of FIG. 1, the skilled person will appreciate that other methods of forming an ion packet of fragmented ions will be equally suitable for the present invention. For example, relatively slow transfer of ions through a multipole can be used to affect bunching of ions, which can subsequently be ejected as a single packet to the TOF mass analyzer. Alternatively orthogonal displacement of ions may be used to form a packet. Further details of these alternatives are found in US20030001088 A1 which describes a travelling wave ion bunching method, the contents of which are herein incorporated by reference.

In FIG. 1, the time of flight mass analyzer 150 shown is a multiple reflection time of flight mass analyzer (mr-TOF) 150. The mr-TOF 150 is constructed around two opposing ion mirrors 160, 162, elongated in a drift direction. The mirrors are opposed in a direction that is orthogonal to the drift direction. The extraction trap 140 injects ions into the first mirror 160 and the ions then oscillate between the two mirrors 160, 162. The angle of ejection of ions from the extraction trap 140 and additional deflectors 170, 172 allow control of the energy of the ions in the drift direction, such that ions are directed down the length of the mirrors 160, 162 as they oscillate, producing a zig-zag trajectory. The mirrors 160, 162 themselves are tilted relative to one another, producing a potential gradient that retards the ions' drift velocity and causes them to be reflected back in the drift dimension and focused onto a detector 180. The tilting of the opposing mirrors would normally have the negative side-effect of changing the time period of ion oscillations as they travel down the drift dimension. This is corrected with a stripe electrode 190 (to act as a compensation electrode) that alters the flight potential for a portion of the inter-mirror space, varying down the length of the opposing mirrors 160, 162. The combination of the varying width of the stripe electrode 190 and variation of the distance between the mirrors 160, 162 allows the reflection and spatial focusing of ions onto the detector 180 as well as maintaining a good time focus. A suitable mr-TOF 150 for use in the present invention is further described in US 2015028197 (A1), the contents of which are hereby incorporated by reference in its entirety.

Ions accumulated in the extraction trap are injected into the mr-TOF 150 as a packet of ions, once a predetermined number of ions have been accumulated in the extraction trap. By ensuring that each packet of ions injected into the mr-TOF 150 has at least a predetermined (minimum) number of ions, the resulting packet of ions arriving at the detector will be representative of the entire mass range of interest of the MS2 spectrum. Accordingly, a single packet of fragmented ions is sufficient to acquire MS2 spectra of the fragmented ions. This represent an increased sensitivity compared to conventional acquisition of time of flight spectra in which multiple spectra typically are acquired and summed for each given mass range segment. Preferably, a minimum total ion current (TIC) in each narrow mass window is accumulated in the extraction trap before ejection to the time of flight mass analyzer. Preferably, at least N spectra (scans) are acquired per second in the MS2 domain by the time of flight mass analyzer, wherein N=50, or more preferably 100, or 200, or more.

Preferably, at least X % of the MS2 scans contain more than Y ion counts (wherein X=30, or 50, or 70, or most preferably 90, or more, and Y=200, or 500, or 1000, or 2000, or 3000, or 5000, or more). Most preferably, at least 90% of the MS2 scans contain more than 500 ion counts, or more preferably more than 1000 ion counts. This provides for an increased dynamic range of MS2 spectra. The desired ion counts for each of the MS2 scans may be provided by adjusting the number ions included in each packet of fragmented ions. For example, in the embodiment of FIG. 1, the accumulation time of the extraction trap may be adjusted to ensure that a sufficient number of ions have been accumulated. As such, the controller 195 may be configured to determine that a suitable packet of fragmented ions has been formed when either a predetermined number of ions are present in the extraction trap, or a predetermined period of time has passed. The predetermined period of time may be specified in order to ensure that the time of flight mass analyzer operates at the desired frequency when the flow of ions to the extraction trap is relatively low.

The mass spectrometer 10 is under the control of a controller 195 which, for example, is configured to control the timing of ejection of the trapping components, to set the appropriate potentials on the electrodes of the quadrupole etc so as to focus and filter the ions, to capture the mass spectral data from the orbital trapping device 110, to capture the mass spectral data from the mr-TOF 150, control the sequence of MS1 and MS2 scans and so forth. It will be appreciated that the controller 195 may comprise a computer that may be operated according to a computer program comprising instructions to cause the mass spectrometer to execute the steps of the method according to the present invention.

It is to be understood that the specific arrangement of components shown in FIG. 1 is not essential to the methods subsequently described. Indeed other arrangements for carrying out the DIA methods of embodiments of the present invention are suitable.

An exemplary embodiment of the method will now be described with reference to FIGS. 2 and 3, in which sample molecules are supplied from a liquid chromatography (LC) column as part of the exemplary apparatus described above (as shown in FIG. 1).

In the exemplary embodiment of the invention, the sample ions are supplied from the LC column such that the DIA methodology according to the present invention acquires data about the sample over a duration corresponding to a duration of a chromatographic peak of the sample supplied from the LC column. As such, the controller 195 is configured to perform the method within a time period corresponding to the width (duration) of a chromatographic peak at its base.

Figure 2:
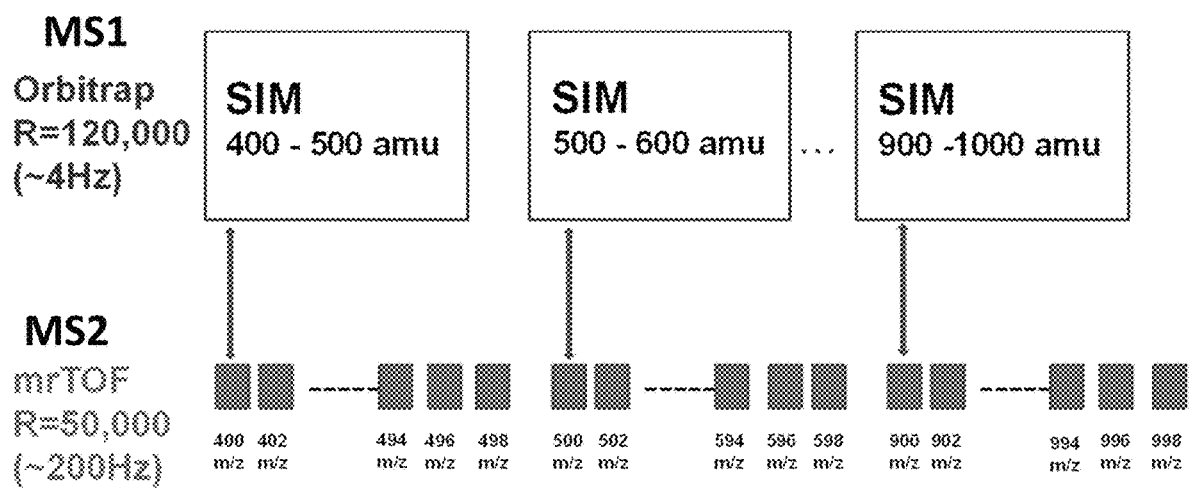
FIG. 2 shows a diagram representative of the MS1 and MS2 scans carried in accordance with an embodiment of the invention.

As shown in FIG. 2, an orbital trapping mass analyzer (denoted "Orbitrap") is utilized to perform a plurality of MS1 scans across a mass range of interest. For example, as shown in FIG. 2, the mass range of interest to be analyzed is 400-1000 m/z. Within the mass range of interest, a plurality of MS1 scans are performed using mass sub ranges of precursor ions of the mass range of interest. Alternatively, a single MS1 scan may be performed using precursor ions from the entire mass range of interest (i.e. 400-1000 amu in this example).

In order to perform a single MS1 scan, sample molecules from an LC column are ionized using the ESI source 20. Sample ions subsequently enter the vacuum chamber of the mass spectrometer 10. The sample ions are directed by through capillary 25, RF-only lens 30, injection flatapole 40, bent flatapole 50 and into the quadrupole mass filter 70 in the manner as described above. The quadrupole mass filter 70 is controlled by the controller 195 to filter the sample ions according to the selected precursor mass sub-range of interest. For example, as shown in FIG. 2 MS1 scans are performed across a mass range of interest from 400 m/z to 1000 m/z in precursor mass sub-ranges of 400-500 m/z, 500-600 m/z . . . to 900-1000 m/z.

Ions then pass through the quadrupole exit lens/split lens arrangement 80, through the transfer multipole 90 and into the C-trap 100 where they are accumulated. From the C-trap 100, (precursor) sample ions of the mass range segment may be injected in to the orbital trapping mass analyzer 110. Once ions are stabilized inside the orbital trapping mass analyzer, the MS1 scan is performed by using the image current detector to detect the ions present in the orbital trapping mass analyzer 110. The detection of the ions in the orbital trapping mass analyzer is configured to be performed with a relatively high resolution for the MS1 scan (relative to the resolution of the MS2 scans). For example, a resolution (R) of at least 50,000, or preferably at least 100,000 may be used for each MS1 scan (see Resolution R=120,000 in FIG. 2).

By using a Fourier Transform mass analyzer (for example an orbital trapping mass analyzer), the MS1 scans are performed with a high degree of mass accuracy. Preferably, the MS1 scans are performed with a mass accuracy of less than 5, or more preferably 3 parts per million (ppm). Parts per million mass accuracy Δm of a mass analyzer may be determined as the difference between the measured mass of an ion $m_i$ and the actual mass of an ion $m_a$, divided by the actual mass of the ion, multiplied by $10^6$, as shown below:

$$\Delta m = \frac{(m_i - m_a)}{m_a} \times 10^6$$

In tandem with the MS1 scans, a plurality of MS2 scans are performed, as shown in FIG. 2. The MS2 scans are performed using a time of flight mass analyzer, or more preferably a mr-TOF, as shown in FIG. 2.

In order to perform a single MS2 scan of a mass range segment, sample molecules from an LC column are ionized and injected into the mass spectrometer in a similar manner to the MS1 scan. The sample ions for the MS2 scan progress through the capillary 25, RF-only lens 30, injection flatapole 40, bent flatapole 50 and into the quadrupole mass filter 70 in a similar manner to the sample ions for the MS1 scan.

Once the sample ions for the MS2 scan reach the quadrupole mass filter 70, the quadrupole mass filter 70 is controlled by the controller 195 to filter the sample ions according to the relatively narrow mass range segment being scanned. Each precursor mass range segment has a mass range of no greater than 5 amu, or preferably no greater than 3 amu, or more preferably no greater than 2 amu (as shown in FIG. 2).

The (filtered mass range segment) precursor ions pass from the quadrupole mass filter 70 through to the C-trap 100 as described above for the MS1 scan. The controller 195 then controls the C-trap to allow the precursor ions to pass through in an axial direction towards the fragmentation chamber 120.

In the HCD fragmentation chamber 120, the precursor ions collide with collision gas molecules which results in the fragmentation of the precursor ions into fragment ions.

The fragmented ions for the mass range segment are then ejected from the fragmentation chamber at the opposing axial end to the C-trap 100. The ejected fragmented ions pass into a second transfer multipole 130. The second transfer multipole 130 guides the fragmented ions from the fragmentation chamber 120 into an extraction trap (second ion trap) 140 where they are accumulated. The fragmented ions may be accumulated in the extraction trap 140 for a predetermined time.

Fragmented ions are then injected from the extraction trap injected into the mr-TOF. The prior accumulation of fragmented ions in the extraction trap allows the fragmented ions to be injected as a packet into the mr-TOF. The packet of ions travels along the flight path of the mr-TOF undergoing multiple reflections before being detected at the detector. The varying arrival times of the fragmented ions within the packet allows a MS2 mass spectrum for the packet of fragmented ions to be generated. The length of the flight path of the mr-TOF in combination with the time resolution of the detector allows the mr-TOF to perform MS2 scans at a resolution in excess of 40,000 (see R=50,000 in FIG. 2).

One benefit of the packet-based approach to the analysis of the fragmented ions in the MS2 domain, is that once the accumulated ions are ejected from the extraction trap, the fragmented ions for the next mass range segment can begin to fill the extraction trap. As such, fragmented ions from one mass range segment can be travelling through the mr-TOF while the next mass range segment of fragmented ions is being accumulated. Thus, a greater number of ion counts in each MS2 scan can be achieved within a chromatographic peak due to the use of the accumulated packet based injection of fragmented ions into the mr-TOF from the extraction trap.

According to the exemplary embodiment, in a single cycle of the DIA methodology, the controller 195 controls the mass spectrometer 10 to perform the plurality of MS1 scans of the mass sub-ranges for the mass range of interest, and in tandem the plurality of MS2 scans of the mass range segments over the mass range of interest. In order to acquire a more accurate sample of the chromatographic peak, the controller 195 may repeat the cycle of the DIA methodology a number of times over the duration of the chromatographic peak. For example, a single cycle of the DIA methodology may take around 1.5 s to perform. As such, the cycle may be performed at least 7 times, or more preferably at least 9 times over the duration of a chromatographic peak. This enables the MS1 and/or MS2 spectral data to be used for quantitation of the eluting sample in the chromatographic peak.

Figure 3:
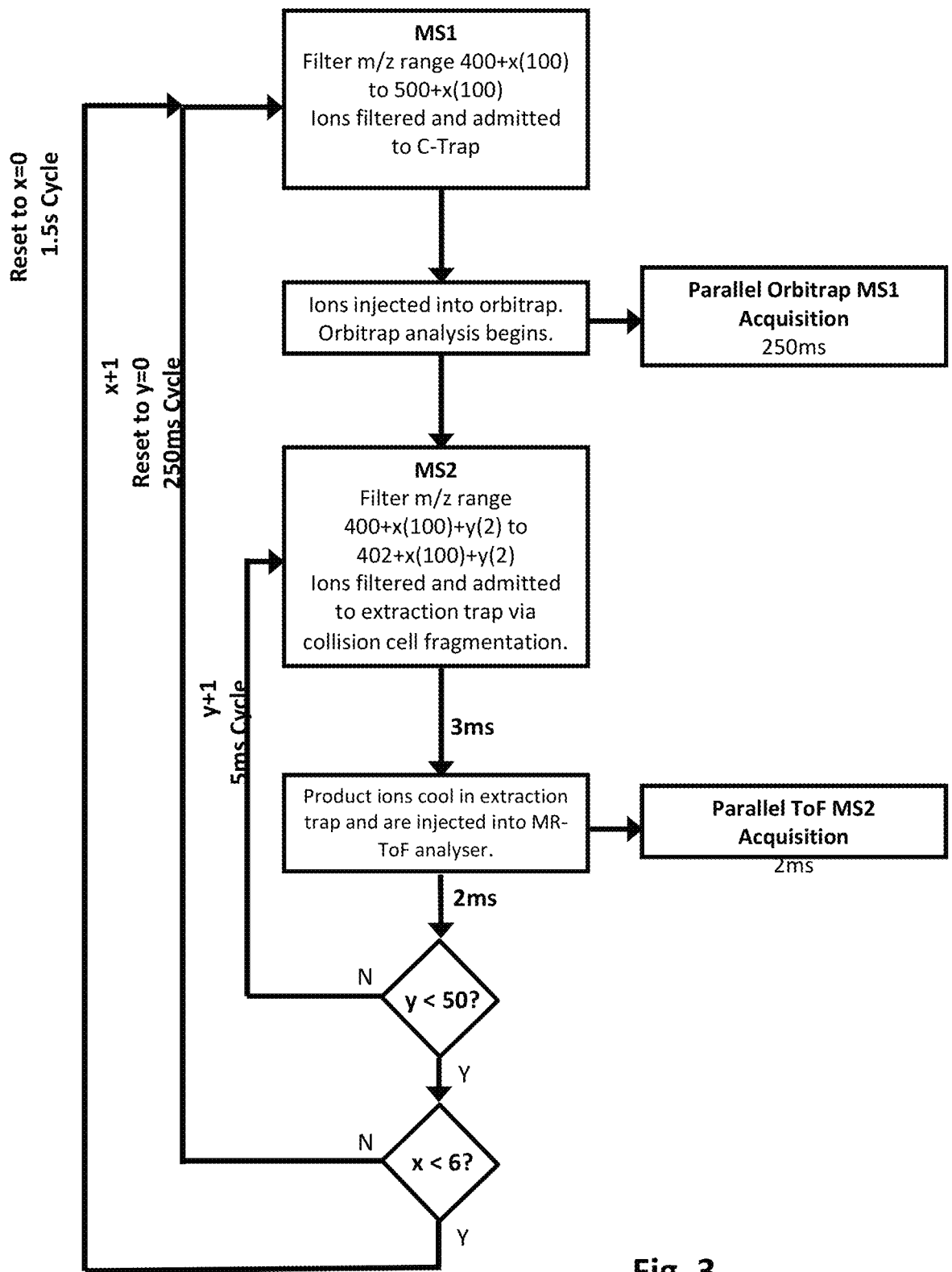
FIG. 3 shows an exemplary flow chart of the DIA methodology according to an embodiment of the present invention.

A further exemplary embodiment of the method of the present invention is described in the flow chart of FIG. 3. As shown in FIG. 3, a plurality of MS1 and MS2 scans may be performed in tandem. In the further exemplary embodiment, sample molecules may be supplied from a liquid chromatography (LC) column, for example as part of the exemplary apparatus described above (as shown in FIG. 1).

According to the further exemplary embodiment, at a time T1, precursor ions travel from the ESI 20 source through to the C-trap 100, for example in a manner as described previously. Along the way, the precursor ions are filtered by the quadrupole mass selector 70 to leave ions in a first mass range segment (e.g. 400-500 m/z).

Once the C-trap 100 is filled, at a time T2, precursor ions in the first mass range segment are ejected to the orbital trapping mass analyzer 110 for performing the MS1 scan. The MS1 scan in the orbital trapping mass analyzer 110 is performed in tandem (parallel) with the plurality of MS2 scans in the mr-TOF 150. As shown, one MS1 scan in the orbital trapping mass analyzer for one of the mass sub-ranges (at resolution of 120,000) takes 0.25 seconds.

At a time T3, a packet of precursor ions is passed from the ESI source 20, filtered through the quadrupole mass selector through the C-Trap 100 and to the collision cell. The quadrupole mass selector 70 filters the ions to define a first mass range segment (e.g. 400-402 m/z as shown in FIG. 3). Effectively, the C-Trap 100 operates as an ion guide except at times T1 and T2.

At a time T4, the first mass range segment of precursor ions are then sent to the collision cell 120, where they are fragmented. The fragmented ions are then sent onwards to the mr-TOF 150 where they are accumulated in the extraction trap 140

At a time T5, the extraction trap 140 ejects a packet of fragmented ions for travel along the flight path.

At a time T6, the mr-TOF 150 detects the fragmented ions at the detector 180. As shown, one MS2 scan in the time of flight mass analyzer for one of the mass range segments (at resolution of 50,000, 500 Hz) takes 2 milliseconds. According to the embodiment of FIG. 3, although the MS2 scan takes 2 ms to perform, the time taken to fragment the ion (3 ms), and accumulate the ions in the extraction trap and eject them (2 ms) takes a total time period of 5 ms. Accordingly the time period for performing a single MS2 scan according to this embodiment is set by this 5 ms time period. In other embodiments, the time for performing these method steps may be varied in order to vary the frequency of performing the MS2 scans.

At a time T7, a subsequent set of precursor ions is filtered to using the next narrow mass window for the next MS2 scan (i.e. mass range 402-404 m/z), fragmented in the collision cell (time T8), ejected from the extraction trap (time T9) and detected at the detector (time T10). As such, the DIA apparatus processes multiple packets of ions for the MS2 scans at once at different points in the system. For example, the extraction trap is being filled with ions while the previous ion packet is flying through the mr-TOF 150. As such, the parallel TOF MS2 acquisition step is performed concurrently with the steps of fragmenting the ions and accumulating the ions for ejection into the TOF. In some embodiments, it is preferable that while fragmented ions are cooling in the extraction trap 140 a further ion packet should be fragmenting in the collision cell 120.

Thus, as shown in FIG. 3, MS2 scans are performed for each narrow mass window across the precursor mass sub-range (e.g. 400-500 m/z).

Once the MS1 scan and the plurality of MS2 scans for the mass sub-range 400-500 m/z are complete, the MS1 scan and MS2 scans above are repeated for the next mass sub-range (e.g. 500-600 m/z). Accordingly, in the exemplary embodiment of FIG. 3, performing the MS1 scan and plurality of MS2 scans for each mass sub-range takes 250 ms. Thus, the complete DIA scan of the mass range of interest may be completed in a cycle time of 1.5 s. By performing a high resolution, high mass accuracy DIA methodology with a cycle time of 1.5 s, the DIA methodology of the present invention may be performed a number of times over the duration of a chromatographic peak. For example, the method of the present invention may be repeated at least: 3, 5, 7, 9, or more preferably at least 10 times across the duration of the chromatographic peak. Thus, a chromatographic peak may be fully sampled using a DIA methodology according to the present invention.

The precursor ion spectra acquired at high resolution and high mass accuracy in the orbital trapping mass analyzer can be used to produce a precursor ion candidate list using a standard non-fragment ion-database. In-silico fragmentation of the candidates in the list produces within the narrow mass range of interest a library against which fragmentation spectra are compared and/or quantified as known in the art in order to provide identification of the precursor ions.

The skilled person will understand from FIG. 3, that the DIA methodology of the present invention may be applied to any mass range of interest. For example, a mass range of interest may include a mass to charge ratio of at least: 50, 100, 200, 300, 400 or 500 m/z in order to analyze precursor ions of a relatively small m/z. A mass range of interest may also include a mass to charge ratio of up to: 800, 900, 1000, 1200, 1400, 1600, 2000 or 2500 m/z in order to analyze precursor ions of a relatively large m/z.

In one alternative embodiment, a set of MS2 scans may be acquired by multiplexing precursor ions from a plurality of different mass range segments in a single MS2 analysis. In this alternative method of performing a set of MS2 scans, the MS1 scans may be acquired according to any of the methodologies described previously.

In the alternative embodiment, for each MS2 scan making up the set of MS2 scans, a plurality of mass range segments are selected. A different combination of mass range segments is selected for each scan in the set of MS2 scans, and also ensures that every mass range segment is selected at least once. In the alternative embodiment, precursor ions from the selected combination of mass range segments may be fragmented and analyzed together as part of a single MS2 scan. The precursor ions in each mass range segment may be fragmented separately and the resulting fragmented ions formed (accumulated) into a packet together to be scanned together in the TOF mass analyzer. Alternatively, the precursor ions in the plurality of mass range segments to be combined may be fragmented together, and then scanned together in the TOF mass analyzer. For example, a first MS2 scan may be performed on precursor ions from mass range segments with mass to charge ratios of 400-402, 420-422 and 440-442. A second MS2 scan may then be performed on a different combination of mass range segments. Once all the MS2 scans in the set have been performed, the MS2 data may be deconvoluted in order obtain data suitable for identification and/or quantitation of the sample. Further details of the methodology and the deconvolution process may be found in "Multiplexed MS/MS for improved data-independent acquisition", Egertson J D et al, Nature Methods 10, 29 Aug. 2012, doi:10.1038mmeth.2528, the contents of which is herein incorporated by reference.

Figure 4:
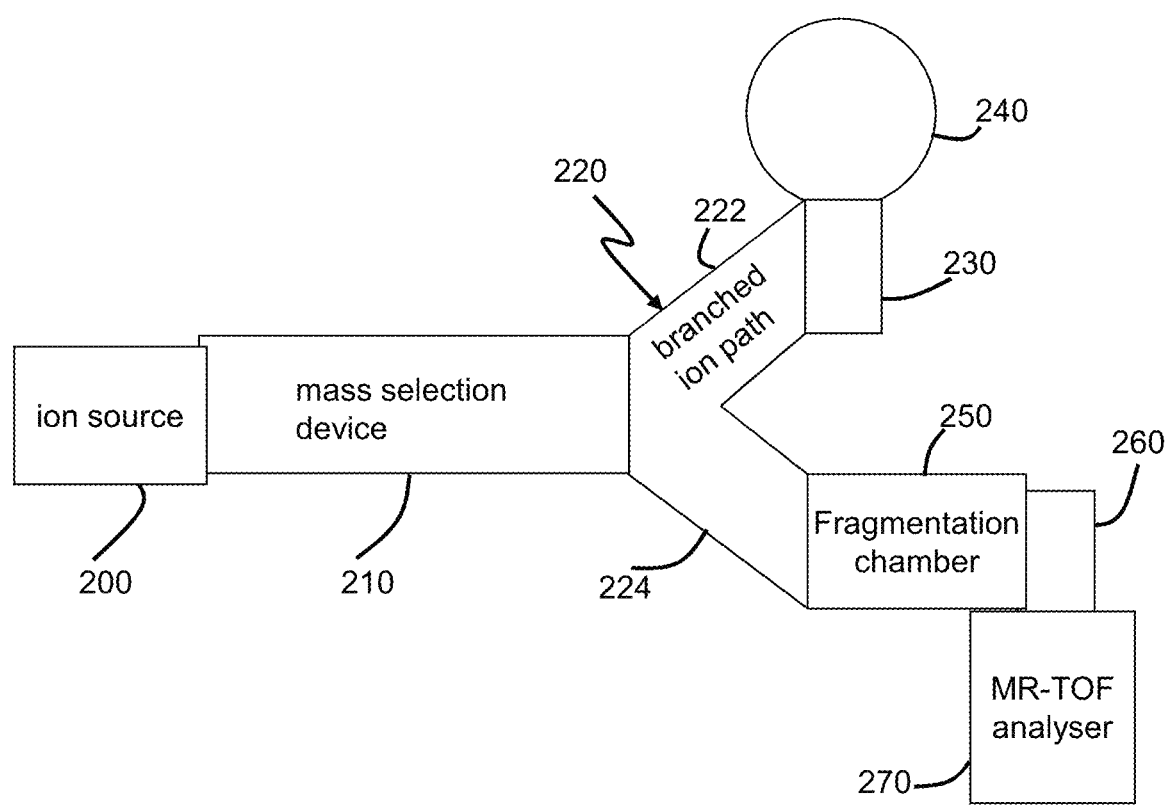
FIG. 4 shows a schematic diagram of an alternative mass spectrometer suitable for carrying out method in accordance with embodiments of the invention.

In a further alternative embodiment, the mass spectrometer according to the present invention may be provided in a branched path arrangement, for example as shown in the embodiment in FIG. 4. In the embodiment of FIG. 4, an ion source 200 is coupled to a mass selection device 210. Such an arrangement may be provided by the ESI ion source 20 and its respective couplings to the quadrupole mass filter 70 as shown in the embodiment of FIG. 1 for example.

As shown in FIG. 4, the output of the mass selection device 210 is coupled to the branched ion path 220. The branched ion path directs ions output from the mass selection device along one of two paths. A first path 222 directs ions to a C-trap 230 where ions are collected for analysis by a Fourier Transform mass analyzer, for example an orbital trapping mass analyzer 240 in the MS1 domain. A second path 224 directs ions to a fragmentation chamber 250 for fragmentation of ions and subsequent mass analysis in the MS2 domain. The branched ion path may use an rf voltage to direction ions down either the first path 222 or the second path 224. The branched ion path may be a branched RF multipole. A branched ion path suitable for use in the embodiment of FIG. 4 is further described in U.S. Pat. No. 7,420,161.

According to the alternative embodiment in FIG. 4, the branched ion path may be used to direct ions to a C-trap 230 for MS1 analysis or to a fragmentation chamber 250 for MS2 analysis. Fragmented ions ejected from the fragmentation chamber 250 may be accumulated in ion extraction trap 260, before being injected into mr-TOF analyzer 270 as a packet. As such, the arrangement of the fragmentation chamber 250, ion trap 260 and mr-TOF 270 may be provided by a similar arrangement as described in FIG. 1.

Figure 5A:
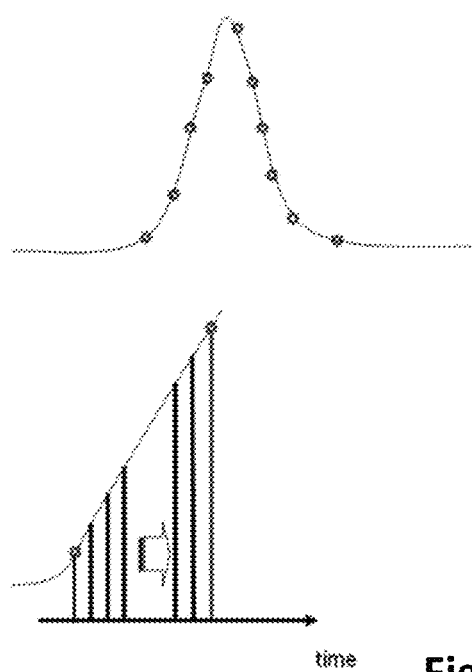
FIG. 5a shows an example of the DIA methodology according to an embodiment of the present invention superimposed onto the characteristics of a chromatographic peak.
Figure 5B:
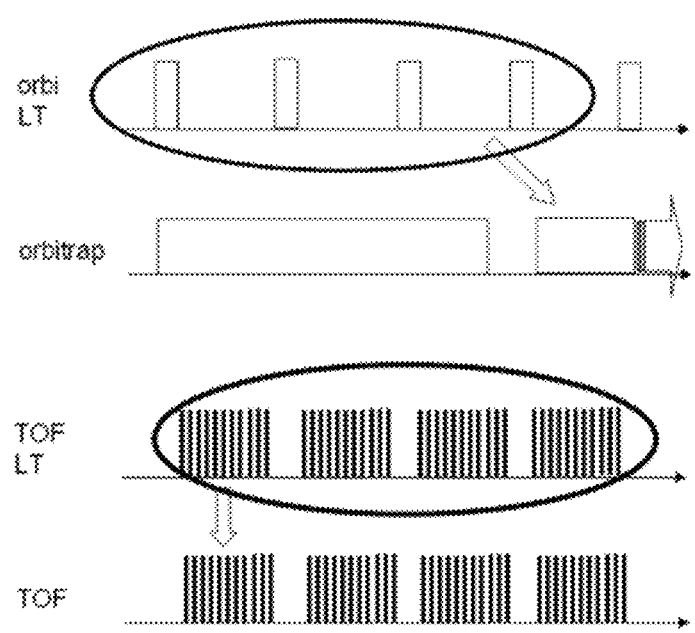
FIG. 5b shows a schematic diagram of timings associated with the loading of the mass analyzers in accordance with embodiments of the invention.

Thus, according to the alternative embodiment in FIG. 4, ions may be directed for MS2 analysis without requiring the C-trap 230 supplying the MS1 orbital trapping mass analyzer 240 to be empty. Such a configuration may allow increased parallelisation of the MS1 and MS2 scans. As such, a greater proportion of the duration of a chromatographic peak may be available for carrying out MS2 scans. Furthermore, in this configuration, a number of loadings or fills can be accumulated in the C-trap 230 before analysis in the orbital trapping mass analyzer 240, as shown in FIGS. 5a and 5b, which are discussed further below. In such embodiments, the loading (filling) of the C-trap 230 can be split into several small fills while the orbital trap mass analyzer 240 is scanning, thereby to obtain a population of ions that is more representative of the ions from across the entire peak.

FIGS. 5a and 5b show schematic diagrams of a method of DIA analysis using the branched path configuration of the mass analyzers. FIG. 5a shows a representation of a chromatographic peak of a sample as it elutes from a chromatographic apparatus. The dots superimposed on the peak represent time periods in which an MS1 scan is started, while the lines are representative time periods in which individual MS2 scans are performed. As such, the dots correspond to starting points for separate cycles of the DIA methodology.

By utilizing the branched path arrangement, the C-trap 230 is no longer in the path of the supply of ions to the fragmentation chamber for performing the MS2 scans. Accordingly, the C-trap 230 according to the branched path embodiment may be loaded over an extended time period using a plurality of smaller filling steps.

FIG. 5b shows a schematic representation of the operation of the C-trap and Orbitrap over time for performing MS1 scans according to the embodiment of FIG. 5. The axis denoted "orbi LT "represents the ion flow into the C-trap 230 over time, while the axis denoted "orbitrap" represents the operation of the orbital trapping mass analyzer for performing an MS1 scan over time. As shown in FIG. 5b, ions flow into the C-trap 230 at a number of relatively short periods over the duration of an MS1 scan by the orbital trapping mass analyzer. As such, the C-trap 230 is filled using a plurality of fills distributed over a period of time corresponding to the duration of an MS1 scan. As such, in a sequence of MS1 scans, the ions for the following MS1 scan are loaded into the C-trap 230 while the current MS1 scan is performed. Advantageously, by loading the C-trap 230 in this manner, the ions in the C-trap 240 may be more representative of the sample over the duration of loading.

As further shown in FIG. 5b, the loading of the C-trap 230 is performed in parallel with the performance of the loading of the extraction trap for the MS2 scans. The axis in FIG. 5b denoted "TOF LT" represents the ion flow into the extraction trap 260 over time. The axis denoted "TOF" in FIG. 5b represents the operation of the TOF mass analyzer performing MS2 scans over time. As shown in FIG. 5b, each filling of the extraction trap has a corresponding MS2 scan. The skilled person will appreciate that the graph is not to scale and is not intended to accurately represent the relative frequencies of the performance of the MS1 and MS2 scans.

Figure 6:
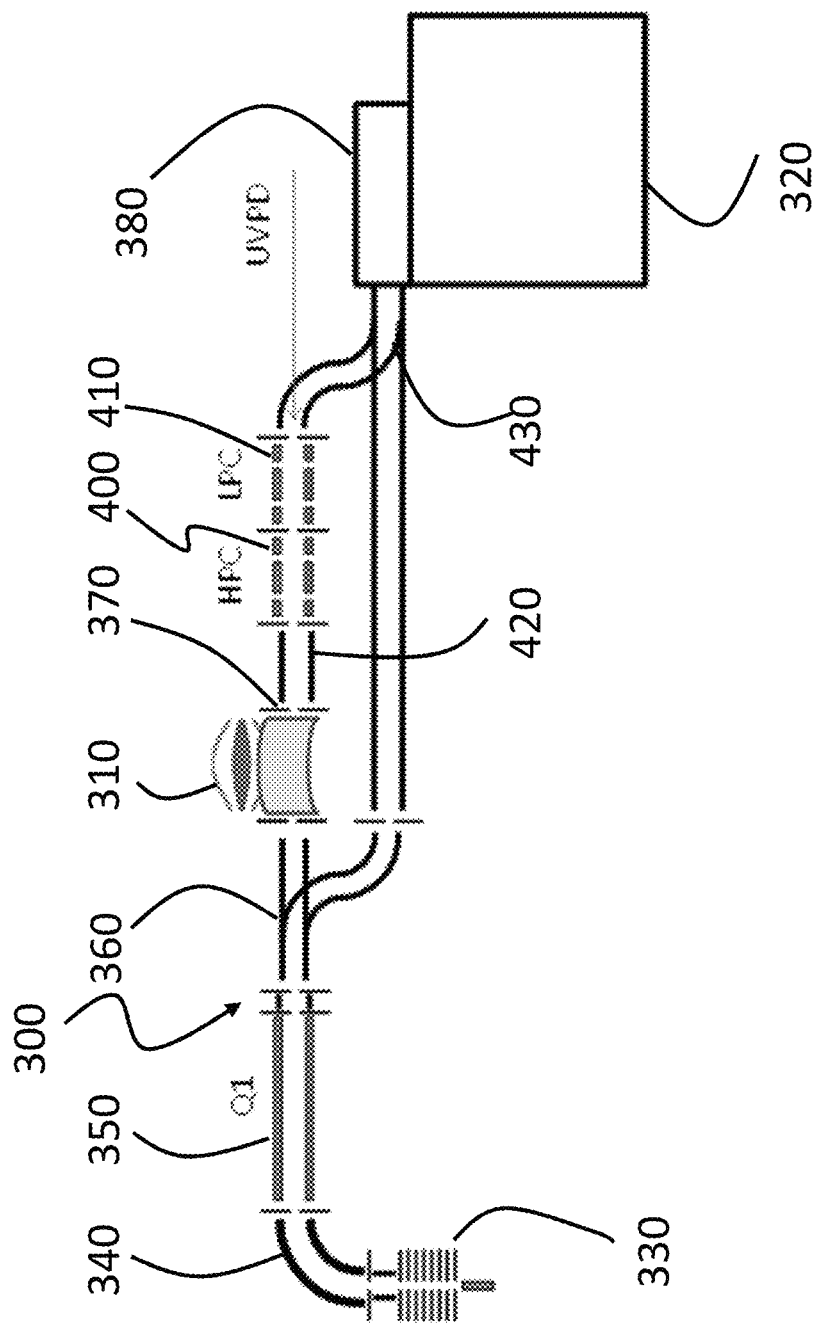
FIG. 6 shows a schematic diagram of a further alternative mass spectrometer suitable for carrying out method in accordance with embodiments of the invention.

A further alternative embodiment of the invention is disclosed in FIG. 6. FIG. 6 depicts a schematic diagram of a tandem mass spectrometer 300 including an orbital trapping mass analyzer 310 and a time of flight mass analyzer 320 in a branched path configuration.

The embodiment in FIG. 6 includes an ion source 330 and ion guide 340 which supply precursor ions to a mass selector 350. Such an arrangement may be provided by the ESI ion source 20 and its respective couplings to the quadrupole mass filter 70 as shown in the embodiment of FIG. 1 for example.

As shown in FIG. 6, a branched ion path 360 guides ions from the mass selector 350 to a C-trap 370 and/or an extraction trap 380. The C-trap 370 supplies ion to the orbital trapping mass analyzer 310 for MS1 scans, while the extraction trap 380 supplies ions to the time of flight mass analyzer 320. For example, a similar arrangement to the embodiment disclosed in FIG. 4 may be provided.

FIG. 6 additionally includes a dual linear trap 400,410. The dual linear trap is connected downstream of the C-trap 370 between the C-trap 370 and the extraction trap 380 for the time of flight mass analyzer. The dual linear trap may be connected to the C-trap 370 and the extraction trap 380 by ion guides 420, 430. Ion guide 430 may be a branched ion path which merges with the ion path from the mass selector 350 in order to connect to the extraction trap 380.

The dual linear trap 400, 410 may be provided for fragmentation and/or mass isolation of the ions. For example, a first ion trap 400 may be provided as a high energy collision dissociation chamber. A second ion trap, downstream of the first ion trap may be provided as a low collision dissociation chamber. By including a second dissociation chamber, fragmented ions may readily be fragmented again in the second chamber in order to perform MS3 analysis. Ions may be repeatedly isolated and fragmented for $MS^n$ analysis. The dual linear trap may also allow for fragmentation by collision induced dissociation (CID), electron capture dissociation (ECD), electron transfer dissociation (ETD), ultraviolent photo dissociation (UVPD), and so forth. Further details of a suitable dual ion trap may be found in U.S. Pat. No. 8,198,580, the contents of which is herein incorporated by reference in its entirety.

Advantageously, by providing a branched path directly to the extraction trap 380 from the mass selector 350, ions may be more efficiently transferred from the mass selector 350 to the extraction trap.

The above described mass spectrometers may also be well suited to carrying out the DIA methodologies described in GB 1701857.3 (the contents of which is hereby incorporated by reference in its entirety), wherein the MS2 scans are performed using the time of flight analyzer of the above described mass spectrometers, and MS1 scans are performed using the above described orbital trapping mass analyzers.

It will be appreciated that other embodiments of ion injection into the time of flight mass analyzer may be used in place of the extraction trap, although they may not be as advantageous. For example, an orthogonal accelerator may be used to inject packets of ions into the time of flight mass analyzer. However, the ion counts in each MS2 spectrum, and thus dynamic range and sensitivity, in such embodiments will typically be lower than can be obtained using the extraction trap to accumulate ions before each injection into the time of flight mass analyzer. In a further alternative embodiment, a slow transfer multipole may be used in place of the extraction trap to inject packets of ions into the time of flight mass analyzer. In this way, ions may be bunched in the multipole (and not lost) before each packet is injected into the TOF analyzer.

Advantageously, the present invention may be used to create a high resolution, high mass accuracy DIA workflow, which can deliver high confidence of identification, and better precision of quantitation than approaches previously known in the art. In some embodiments, the present invention is capable of delivering 100% identification of all detectable features in a sample in the MS1 level and with a higher degree of sensitivity than quantitation in the MS2 level, as quantitation is performed prior to fragmentation of the sample precursors (i.e. with unfragmented precursors). For example, quantitation of precursor ions may be performed in the MS1 domain using a "library free" approach, thus reducing the requirements on post-processing of the acquired data. One method for analyzing DIA MS1 scan data and quantitating precursor ions using a library free approach is described in "DIA-Umpire: comprehensive computational framework for data independent acquisition proteomics", Tsou et al, Nat Methods, March 2015 p258-264.

For successful identification of precursor ion information by the methodology of the present invention, the MS1 scans are performed with a resolution of preferably at least 50,000, or more preferably at least 100,000K, or better still at least 200,000 and preferably 1-2 ppm or better in mass accuracy, while in the ion fragment (MS2) spectra at least 40,000 or more preferably at least 50,000 resolution and preferably 5-10 ppm or better mass accuracy is preferable.

Furthermore, the relatively narrow mass windows of each of the MS2 scans (<5 amu), together with their relatively high mass resolution and mass accuracy, allows the DIA methodology of the present invention to be utilized in combination with the traditional database search approach known from data dependent analysis (DDA). As such, DDA algorithms, or other spectral library-free algorithms may be utilized to perform the DIA data analysis and provide high confidence identification of precursors in the sample. In this way, the DIA methodology of the present invention does not require the building up a spectral library in advance, as is currently the case in known DIA methodologies.

The invention claimed is:

1. A data independent acquisition method of mass spectrometry for analyzing a sample within a mass range of interest, the method being performed within a time period based on a width of a chromatographic peak of the sample as it elutes from a chromatography system and comprising the steps of:
    ionizing the sample to produce a plurality of precursor ions;
    selecting precursor ions within a mass range of interest to be analyzed;
    performing at least one MS1 scan of the precursor ions comprising:
        mass analyzing precursor ions across the mass range of interest using a Fourier Transform mass analyzer, for identification and/or quantitation of the precursor ions in the MS1 domain; and
    performing a set of MS2 scans, the set of MS2 scans comprising:
        segmenting the precursor ions into a plurality of precursor mass segments, each precursor mass segment having a mass range of no greater than 5 amu;
        wherein for each precursor mass segment:
            fragmenting the precursor ions within that precursor mass segment; and
        performing an MS2 scan of the fragmented ions by:
            forming an ion packet from the fragmented ions; and
            injecting the ion packet of fragmented ions into a time of flight mass analyzer and mass analyzing the fragmented ions.

2. A data independent acquisition method of mass spectrometry according to claim 1 wherein:
    the Fourier Transform mass analyzer performs the MS1 scans with a resolution of at least 50,000 at m/z=200; and/or
    the Fourier Transform mass analyzer performs the MS1 scans with a mass accuracy of less 3 ppm.

3. A data independent acquisition method of mass spectrometry according to claim 1 wherein:
    the time of flight mass analyzer performs the MS2 scans with a resolution of at least 40,000 at m/z=200; and/or
    the time of flight mass analyzer performs the MS2 scans with a mass accuracy of less than 5 ppm; and/or
    the time of flight mass analyzer performs the MS2 scans at a frequency of at least 100 Hz.

4. A data independent acquisition method of mass spectrometry according to claim 1 wherein:
    each precursor mass segment has a mass range of no greater than 3 amu.

5. A data independent acquisition method of mass spectrometry according to claim 1 wherein:
the Fourier Transform mass analyzer is an orbital trapping mass analyzer.

6. A data independent acquisition method of mass spectrometry according to claim 1 wherein:
a fragmentation energy for fragmenting each precursor mass sub-range segment is adjusted according to the mass range of each precursor mass sub-range segment.

7. A data independent acquisition method of mass spectrometry according to claim 1 wherein:
the ion packet of fragmented ions is formed by accumulating fragmented ions in an ion trap for a predetermined time.

8. A data independent acquisition method of mass spectrometry according to claim 1 wherein:
at least 50% of the MS2 scans contain more than 1000 ion counts.

9. A data independent acquisition method of mass spectrometry according to claim 1 wherein:
performing the at least one MS1 scan of the precursor ions across the mass range of interest further comprises:
separating the precursor ions in the mass range of interest into a plurality of mass sub-ranges, and for each mass sub-range of precursor ions:
mass analyzing the sub-range of precursor ions using the Fourier Transform mass analyzer.

10. A data independent acquisition method of mass spectrometry according to claim 1 wherein:
the mass range of the precursor ions in each mass sub-range is no greater than 300 amu, or more preferably 200 amu, or more preferably 100 amu; and/or
the mass range of interest is a range of at least 600 amu, or more preferably at least 800 amu or more preferably at least 1000 amu.

11. A data independent acquisition method of mass spectrometry according to claim 1 wherein:
performing an MS2 scan of the set of MS2 scans includes combining fragmented ions from a plurality of precursor mass segments such that the combined fragmented ions are mass analysed.

12. A data independent acquisition method of mass spectrometry according to claim 1 wherein:
the MS1 scan and the set of MS2 scans are repeated at least 4 times over the duration of the chromatographic peak.

13. A data independent acquisition method of mass spectrometry according to claim 1 wherein:
the MS1 scan and the set of MS2 scans are performed in tandem.

14. A mass spectrometer for performing data independent mass spectrometry on a sample across a mass range of interest, the mass spectrometer comprising:
a chromatography system configured to separate molecules of a sample;
an ionisation source for producing a plurality of precursor ions from the sample molecules provided by the chromatography system;
a mass selector;
a Fourier Transform mass analyzer;
a fragmentation apparatus;
an ion packet forming apparatus;
a time of flight mass analyzer;
a controller configured:
i) to cause the mass selector to select precursor ions within the mass range interest; and
ii) to cause the Fourier Transform mass analyzer to perform at least one MS1 scan of the selected precursor ions for identification and/or quantitation of the precursor ions in the MS1 domain; and
iii) to cause the time of flight mass analyzer to perform a set of MS2 scans wherein:
the controller causes the mass selector to further segment the precursor ions into a plurality of precursor mass segments, each precursor mass segment having a mass range of no greater than 5 amu;
where for each precursor mass segment the controller causes:
the fragmentation apparatus to fragment precursor ions within the precursor mass segment into a plurality of fragmented ions;
the ion packet forming apparatus to form an ion packet from the fragmented ions;
the ion packet forming apparatus to inject the fragmented ions into the time of flight mass analyzer; and
the time of flight mass analyzer to mass analyse the fragmented ions across the mass range of interest.

15. A mass spectrometer according to claim 14 wherein:
the Fourier Transform mass analyzer is configured to perform the MS1 scans with a resolution of at least 50,000 at m/z=200; and/or
the Fourier Transform mass analyzer is configured to perform the MS1 scans with a mass accuracy of less 3 ppm.

16. A mass spectrometer according to claim 14 wherein:
the time of flight mass analyzer is configured to perform the MS2 scans with a resolution of at least 40,000 at m/z=200; and/or
the time of flight mass analyzer is configured to perform the MS2 scans with a mass accuracy of less than 5 ppm; and/or
the time of flight mass analyzer is configured to perform the MS2 scans at a frequency of at least 100 Hz.

17. A mass spectrometer according to claim 14 wherein:
the ion packet forming apparatus is a first ion trap.

18. A mass spectrometer according to claim 14 wherein the mass spectrometer further comprises:
a branched path ion guide configured to guide precursor ions from the mass selector to the Fourier transform mass analyzer and/or the fragmentation chamber.

19. A mass spectrometer according to claim 18 further comprising:
a second ion trap, the second ion trap configured to trap precursor ions provided from the mass selector to the Fourier Transform mass analyzer and supply the ions to the Fourier Transform mass analyzer for the MS1 scan;
wherein the controller is configured to cause the second ion trap to trap precursor ions at a plurality of different times over the duration of the chromatographic peak, before supplying the ions to the Fourier transform mass analyzer.

20. A mass spectrometer according to claim 14 wherein:
the time of flight mass analyzer is a multiple reflection time of flight mass analyser.

21. A mass spectrometer according to claim 14 wherein:
the controller is configured to cause ion packets formed by the ion packet forming apparatus provide that at least 30% of the MS2 scans contain more than 200 ion counts.

22. A mass spectrometer according to claim 14 wherein:
for the at least one MS1 scans, the controller is configured:

to cause the mass selector to select precursor ions in a one of a plurality mass sub-ranges of the mass range of interest; wherein for each mass sub-range of precursor ions making up the mass range of interest:

the controller is configured to cause the Fourier Transform mass analyzer to mass analyzing the mass sub-range of precursor ions.

* * * * *